2,695,862

PROCESS FOR OBTAINING VITAMIN $B_{12}$

Edward L. Rickes, Rahway, and Thomas R. Wood, Murray Hill, N. J., assignors to Merck & Co., Inc., Rahway, N. J., a corporation of New Jersey No Drawing. Application August 4, 1949,
Serial No. 110,222

9 Claims. (Cl. 167—81)

This application is a continuation-in-part of our pending applications, Serial No. 20,356, filed April 10, 1948, now abandoned, and Serial No. 38,175, filed July 10, 1948, now abandoned.

This invention relates to the preparation and isolation of a therapeutically valuable substance and more particularly, to the preparation of a substance obtained by the cultivation of suitable strains of the microorganism *Streptomyces griseus* in suitable culture mediums.

The new chemical compound with which our invention is concerned, and which we have named, vitamin $B_{12}$, is capable of promoting the growth of *Lactobacillus lactis* Dorner, and possesses marked and effective action in the therapeutic treatment of Addisonian pernicious anemia and other macrocytic anemias.

Regarded in certain of its broader aspects, the process according to the present invention, comprises extracting a crude concentrate predominantly composed of *Streptomyces griseus* elaboration products with a solvent, effecting a chromatographic fractionation by adding said solvent solution to a column of adsorbent material, washing the column with solvent to fractionally elute the active substance from the adsorbent medium and recovering crystalline vitamin $B_{12}$ from the eluate.

In preparing our novel chemical compounds, we utilize as a starting material a crude L. L. D. active concentrate of *Streptomyces griseus* elaboration products containing in some instances the anti-biotic streptomycin or grisein.

In accordance with one procedure, the crude starting concentrate is prepared by cultivating on a suitable nutrient medium a strain of the microorganisms *Streptomyces griseus* which produces in addition to grisein, L. L. D. active ingredients from which vitamin $B_{12}$ may be derived as herein described, adsorbing the active material from the culture broth with a suitable adsorbent material, preferably activated charcoal, eluting the adsorbate with a suitable solvent such as an aqueous solution of pyridine or an alkyl substituted pyridine and concentrating the crude eluate to dryness. Procedures suitable for preparing a crude concentrate which may be utilized as a starting material in our process are disclosed in the application of Frederick A. Kuehl, Jr., and Louis Chaiet, Serial No. 18,848, filed April 3, 1948, now U. S. Patent No. 2,505,053. We have found that such concentrates contain in addition to grisein, L. L. D. active ingredients suitable for deriving vitamin $B_{12}$ by our process. By our treatment grisein, if present in the starting concentrate used is removed, and our products are free from grisein.

We have also found that it is possible to recover vitamin $B_{12}$ from concentrates, prepared by cultivating a strain of *Streptomyces griseus* which produces in addition to streptomycin L. L. D. active ingredients from which vitamin $B_{12}$ may be derived. In practice it is advantageous to separate and recover the streptomycin prior to the vitamin $B_{12}$ procedure by contacting the broth with an ion exchange resin deriving its exchange capacity from a carboxylic group whereby the streptomycin is adsorbed on said resin. The broth, from which the streptomycin has been removed, is treated with an adsorbent such as carbon, the adsorbate eluted with aqueous pyridine, and the eluate evaporated to a small volume. The crude concentrate, which is utilized as a starting material in our process is then precipitated by diluting the concentrated eluate with methanol and adding ether.

When employing concentrates containing vitamin $B_{12}$ and streptomycin without first removing the streptomycin, the broth is freed of the propagation organism, treated with carbon, and vitamin $B_{12}$ is eluted from the carbon adsorbate with pyridine. The streptomycin is not eluted from the carbon with pyridine and remains on the carbon. If an adsorbent material other than carbon is used, the streptomycin is removed in any event by subsequent purification steps of our process. In our process streptomycin, if present in the starting concentrate used, is removed and our products are free from streptomycin. The vitamin $B_{12}$ containing products described herein are therefore free from streptomycin as well as grisein.

In accordance with one embodiment of our invention, the crude concentrate of *Streptomyces griseus* elaboration products is extracted with an extraction solvent, such as water or a lower aliphatic water miscible alcohol, preferably methyl alcohol. The selection of the extraction liquid is determined by the adsorbent material to be used in the chromatographic fractionation.

Various adsorbents can be utilized at various stages in the practice of this invention including activated carbon, activated alumina, and the like. Activated alumina is the preferred adsorbent in the chromatograph step or steps. Aqueous extractions are employed when chromatographic columns containing activated carbon are used, and lower aliphatic water miscible alcohol extractions are used for activated alumina columns. The column is preferably wet packed, by filling with the adsorbent and the solvent used in the extraction and then allowing the solvent to drain out until its level reaches the top of the adsorbent material in the column. The adsorbent is conveniently supported on a wire screen covered with a layer of sand.

When an alumina column is employed for the chromatograph, the alcoholic, preferably methanolic, extract is poured on the upper surface of the adsorbent in the column and allowed to flow into the adsorbent either by gravity or under pressure. The column is then developed with additional amounts of the extraction solvent, to develop in the column zones of adsorbent material containing vitamin $B_{12}$ in differing amounts and differing degrees of purity and suitable fractions of the eluate are collected as the zones emerge from the bottom of the column. Those fractions containing sufficient activity as determined microbiologically, or by virtue of their pink color are concentrated, either separately or combined, to a heavy syrup. This concentrate is then mixed with a lower aliphatic alcohol and a miscible non-solvent in which the active substance is insoluble, such as acetone, is added. The red flocculent precipitate which forms is recovered.

The red flocculent precipitate may be further purified by dissolving it in a solvent for vitamin $B_{12}$, such as, methyl or ethyl alcohol or water, and precipitating it with a miscible non-solvent for vitamin $B_{12}$, such as acetone, one or more times. During such treatment, the solution, if not clear before adding the precipitant, may be filtered to remove insoluble impurities. The number of such precipitations and treatments desirable varies with different batches. A guide to the number of useful precipitations is absence of brownish or yellowish color in the supernatant liquid after precipitation. In some cases, after several such treatments, vitamin $B_{12}$ may be crystallized from a water solution by adding acetone to the point of incipient turbidity and allowing red needlelike crystals to form.

However, when a crystalline product or a high degree of purification is wanted, it is often desirable to subject the product obtained from the first chromatographic fractionation (either before or after one or more of the above mentioned precipitation steps) to a second chromatographic fractionation. This is accomplished by dissolving the amorphous product in a lower aliphatic alcohol. The solution can be added to a second column of activated alumina, and the more active fractions of eluate as determined above can be collected and concentrated to dryness. The dry residue may be dissolved in methyl alcohol and acetone added to the solution causing a red precipitate of vitamin $B_{12}$ to separate. This precipitate may be dissolved in water and acetone added to the solution causing red crystals to separate. Vitamin $B_{12}$ may be repeatedly recrystallized from a water acetone solution to remove any impurities that still remain.

Vitamin $B_{12}$, obtained in a substantially pure state in accordance with our invention, is a red compound, having an approximate composition typified by the following analysis made on two samples dried in vacuo for two hours at 100° C.: 56.35; 56.11; H, 6.72, 6.72; N, 14.51, 14.76; P, 2.24, 2.27; Co. 4.42, 4.58. Substantially all of the difference between the sum of the percentages given and 100% is believed to be oxygen and no other metals are indicated to be present by spectrum analysis. Based on the foregoing analysis vitamin $B_{12}$ has the approximate empirical formula of about

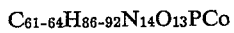

$$C_{61-64}H_{86-92}N_{14}O_{13}PCo$$

Vitamin $B_{12}$ is substantially soluble in water, methyl alcohol, ethyl alcohol and phenol and substantially insoluble in acetone, ether and chloroform. Vitamin $B_{12}$ has an apparent partition coefficient of about 1.46 in the system; 75% toluene–25% ortho-cresol/water. It has been found that vitamin $B_{12}$ has a partition coefficient of about 1.2 in the system water/benzyl alcohol.

Vitamin $B_{12}$ crystallizes from suitable solutions such as aqueous acetone as red crystals having the following crystallographic properties; refractive indices $\alpha$, 1.619; $\beta$, 1.649; $\gamma$, 1.659. Vitamin $B_{12}$ crystals have no definite melting point but darken at about 210°–220° C.

The absorption spectrum of vitamin $B_{12}$ in aqueous solution is characterized by maxima at 2780 Å.

$$(E^{1\%}_{1\,cm.}=114.7)$$

at 3610 Å.

$$(E^{1\%}_{1\,cm.}=203.5)$$

and at 5500 Å.

$$(E^{1\%}_{1\,cm.}=62.7)$$

The spectrum does not change markedly with change of pH; in acid solution the intensity of the 3610 Å. band decreases by about 10% and in alkaline solution there are other small changes and the fine structure becomes less marked.

The infra-red absorption spectrum was determined with a carefully calibrated Perkin-Elmer 12A Spectrometer. The following absorption maxima were observed:

*Wave length in mu ($10^{-4}$ cm.)*

| | |
|---|---|
| 3.05 | S (broad) |
| 4.62 | W |
| 5.98 | S |
| 6.13 | M |
| 6.70 | S |
| 7.14 | S |
| 7.35 | S |
| 7.60 | W |
| 8.15 | S |
| 8.67 | S |
| 9.36 | S |
| 10.00 | S |
| 10.80 | W |
| 11.10 | W |
| 11.81 | M |
| 12.35 | M |

S, M, and W designate strong, medium and weak absorption intensities.

It has been found that vitamin $B_{12}$ obtained in accordance with our invention possesses biological activity such that about 0.000013 microgram per ml. of culture medium is sufficient to support half maximum growth of *Lactobacillus lactis* Dorner under the conditions used.

Vitamin $B_{12}$ possesses high therapeutic value in the treatment of Addisonian pernicious anemia and other macrocytic anemias. Dosage requirements vary with the individual case and are dependent upon the severity and duration of the pathologic condition and the therapeutic response of the patient. The minimum effective therapeutic dose administered intramuscularly in the form of an aqueous saline or isotonic solution is thought to be approximately 1 microgram per day or multiples of this quantity at longer intervals, e. g. approximately 7 micrograms per week.

Clinical investigations of vitamin $B_{12}$ therapy in the treatment of macrocytic anemias are reported in the literature including:

Spies, T. D., Stone, R. E., Garcia Lopez, G., Milanes, F., Lopez Toca, R., and Aramburu, T., "Thymine, Folic Acid, and Vitamin $B_{12}$ in Nutritional Macrocytic Anemia, Tropical Sprue, and Pernicious Anemia," Lancet, 2: 519–522, October 2, 1948.

Hall, B. E., and Campbell, D. C., "Effect of Vitamin $B_{12}$ on the Hematopoietic and Nervous Systems in Addisonian Pernicious Anemia," Journal of Laboratory and Clinical Medicine, 33: 1646, December 1948.

Pure vitamin $B_{12}$ possesses such high therapeutic value in the treatment of macrocytic anemias that a concentrate of vitamin $B_{12}$ derived from microbiological sources in accordance with our process containing as little as 65,000 L. L. D. units/mg. or only about 0.6% vitamin $B_{12}$ may be employed in the treatment of pernicious anemia and to the best of our knowledge is far more potent than any anti-pernicious anemia concentrate previously available. The oral administration in a single dose of a 5% vitamin $B_{12}$ concentrate equivalent to 600 micrograms of vitamin $B_{12}$ produced a maximal hematological response in one patient. In another, an amount of the 5% concentrate equivalent to 25 micrograms was hematopoietically active when injected intramuscularly in a single dose. This material for injection was prepared by dissolving the vitamin $B_{12}$ concentrate in a saline solution.

Vitamin $B_{12}$ is also capable of increasing the growth rate of chicks. For example, in one experiment the addition of thirty parts per billion of substantially pure vitamin $B_{12}$ to a basal diet containing purified caesin (so-called vitamin-free) as the protien source caused an increase in growth rate such that after 16 days' feeding the average weight of the chicks receiving the supplemented diet was 127 grams whereas that of the chicks receiving the unsupplemented diet was 99 grams. The preparation of concentrates suitable for chick-feeding is dealt with in our above-mentioned pending application Serial No. 38,175.

The activity of the products referred to in this application was determined by a microbiological growth response assay method using *Lactobacillus lactis* Dorner as the test organism. A brief description of the assay method which we employed is given below.

*Lactobacillus lactis* Dorner has been reported to require two growth factors, T. J. and L. L. D. Medium modifications incorporated in the formula described below, have eliminated the requirement for the T. J. factor, and the assay as presented is specific for L. L. D. This microorganism shows L. L. D. factor response to vitamin $B_{12}$. Pure crystalline vitamin $B_{12}$ is used as the assay standard and all unknowns are evaluated in terms of microbiological growth-promoting activity, equivalent to the microbiological activity of vitamin $B_{12}$.

The organism, *Lactobacillus lactis* Dorner, A. T. C. C., 10, 697, used in this assay method is available in the American Type Culture Collection. Stock cultures of the organism are maintained on a growth medium which consists of:

1% Difco yeast extract
0.02% tomato juice serum
1% anhydrous dextrose
1.5% agar

The medium used for the inoculum consists of the basal or assay medium to which 1 unit per cc. of vitamin $B_{12}$ is added. The inoculum cells are washed with sterile distilled water and diluted to form a suspension which reads between 90% and 95% light transmission on the Evelyn photometer with a 520 mu filter.

The composition of the assay medium, double strength, is listed below. Ingredients may be conveniently dispensed from stock solutions:

| | |
|---|---|
| DL isoleucine, 200 mg. | Dextrose, 10 gm. |
| DL alpha-alanine, 200 mg. | Sodium acetate, 6 gm. |
| DL aspartic acid, 200 mg. | Fumaric acid, 0.5 gm. |
| DL valine, 200 mg. | Sodium ethyloxalacetate, 0.5 gm. |
| DL methionine, 200 mg. | Riboflavin, 200 mcg. |
| DL glutamic acid, 200 mg. | Calcium pantothenate, 200 mcg. |
| DL threonine, 200 mg. | Thiamin HCl, 200 mcg. |
| DL serine, 200 mg. | Nicotinic acid, 200 mcg. |
| DL phenylalanine, 200 mg. | Pyridoxamine, 400 mcg. |
| DL leucine, 200 mg. | Para-aminobenzoic acid, 40 mcg. |
| L histidine, 200 mg. | Biotin, 0.4 mcg. |
| DL tryptophane, 400 mg. | $MgSO_4 \cdot 7H_2O$, 200 mg. |
| L arginine, 200 mg. | NaCl, 10 mg. |
| L lysine, 100 mg. | $FeSO_4 \cdot 7H_2O$, 10 mg. |
| Aminoacetic acid, 200 mg. | $MnSO_4 \cdot 4H_2O$, 10 mg. |
| L cystine, 200 mg. | $K_2HPO_4$, 500 mg. |
| DL norleucine, 200 mg. | $KH_2PO_4$, 500 mg. |
| L tyrosine, 200 mg. | Folic acid, 2 mcg. |
| | Casein hydrolyzate, 1.0 gm. |
| | Water to 500 cc. |

The basal medium is prepared by combining the amino acids, then adding dextrose, sodium acetate, fumaric acid, heating to dissolve, and immediately readjusting to pH 7. The sodium ethyloxalacetate and vitamins are then added, dissolved, and the solutions again adjusted to pH7. Finally, the salts, folic acid and casein hydrolysates are added, dissolved, and the pH adjusted to 6.6.

A water solution or suspension of the sample to be assayed is diluted so that the solution contains about 0.2 L. L. D. type units per cc. which is then added to the assay tubes in 0.5, 1.0, 1.5, 2.0, and 2.5 cc. amounts. All of the tubes are then adjusted to a volume of 2.5 cc. with water, 2.5 cc. of the basal medium added, and the tubes are finally plugged and sterilized by heating at 120° C. for 13 minutes. After cooling to room temperature, the tubes are inoculated with one drop of the standardized suspension of *L. lactis* and then incubated at 37° C. for 40 hours. After incubation, the tubes are titrated directly with 0.05 N sodium hydroxide to the blue green end point of bromthymol blue.

The activity of the sample may then be determined from the standard curve by the amount of sodium hydroxide required.

The standard curve is prepared with crystalline vitamin $B_{12}$. One milligram of pure crystalline vitamin $B_{12}$ contains $11 \times 10^6$ units. A stock solution is diluted and 0.0, 0.05, 0.1, 0.2, 0.3, 0.4, 0.6, 0.8, 1.0 and 2.0 units added to duplicate series of tubes. Water is added to adjust the volume to 2.5 cc. The procedure described above for the samples under assay is followed with the standard. Typical titration values for the standard series listed above are 1.5, 2.0, 2.7, 4.3, 5.7, 6.6, 7.5, 7.9, 8.0 and 8.4 respectively, in terms of milliliters of 0.05 N sodium hydroxide required to neutralize the acid produced per culture of *L. lactis*.

The following examples illustrate methods of carrying out the present invention, but it is to be understood that these examples are given primarily by way of illustration and not of limitation.

Example 1

A culture broth was prepared by cultivating a grisein-producing strain of the microorganism *Streptomyces griseus* in a suitable culture medium. The resulting broth was freed of the propagation organism and other solid material and treated with an adsorbent material such as carbon. The active material was eluted from the adsorbent with an eluting agent such as aqueous pyridine or aqueous α-picoline. The eluate was then evaporated to a small volume diluted with methyl alcohol and the active concentrate precipitated with ether. The concentrate was then dried. This procedure for the recovery of the active concentrate is disclosed in the application of Frederick A. Kuehl, Jr., and Louis Chaiet, Serial No. 18,848, filed April 3, 1948.

This dried concentrate had a microbiological potency of about 1500 to 2000 L. L. D. units/mg. 750 grams of this dried concentrate was added to about 2.5 liters of dry methyl alcohol. The mixture was stirred for approximately 30 minutes and then filtered. About 2.5 liters of dry methyl alcohol was then added to the solid residue and the mixture was stirred and filtered. This procedure was repeated with two successive 2.5 liter portions of dry methyl alcohol. The combined filtrates had a total microbiological activity of about 1.2 billion L. L. D. units.

The combined filtrates were chromatographically fractionated by adsorption on 7.5 kg. of activated alumina wet with methyl alcohol. Methyl alcohol was then passed through the column and a number of fractions of eluate were collected. Fractions having a high activity (usually at least 10,000 L. L. D. units /ml.) as determined microbiologically and usually indicated by a pink coloration were combined and concentrated at a temperature below 30° C. and a pressure less than atmospheric to about one-tenth of the original volume. A small amount of white insoluble material which formed was removed by filtration. The filtrate was then concentrated in vacuo to a heavy syrup. Absolute ethyl alcohol was added to the syrup and the white insoluble precipitate which separated from solution was removed. An equal volume of acetone was then added to the clear red ethyl alcohol solution, causing a red flocculent precipitate to separate from solution.

The active material precipitated from ethyl alcohol by the addition of acetone was dissolved in approximately 2 ml. of water and again precipitated in the form of a red oil by the addition of about 12 volumes of acetone. The oil was separated, dissolved in about 1 ml. of water, and the solution treated with acetone until turbidity was observed. Upon standing vitamin $B_{12}$ separated from the solution in clusters of small red needle-like crystals.

Example 2

A red flocculent precipitate formed by the addition of acetone to the clear red ethyl alcohol solution, secured as in Example 1, was further purified by the following procedure. Upon washing the precipitate with acetone and drying, there was secured a substance having a microbiological potency of about 4 million L. L. D. units/mg. or about 36% vitamin $B_{12}$. A second crop having similar potency was recovered by the addition to the mother liquor of a second volume of acetone. The further addition of acetone to the mother liquors resulted in the precipitation of a red oil which was recovered. The oil was treated with a mixture of ethyl alcohol and acetone and an amorphous red solid having a microbiological potency of about 1.5 million L. L. D. units/mg. or about 13.5% vitamin $B_{12}$ was precipitated and recovered.

The several dried acetone-insoluble fractions were combined, dissolved in approximately 4 ml. of methyl alcohol and the solution was adsorbed on about 10 grams of activated alumina wet with methyl alcohol in a chromatographic column. The column was then developed with methyl alcohol and a dark red band passed through the column. Upon the appearance of the red color in the eluate, successive 10 ml. fractions were taken until the effluent was substantially colorless. The first three fractions, containing the greater part of the red color, were combined and evaporated to dryness at a pressure less than atmospheric and a temperature below 25° C.

The dry residue was dissolved in approximately 2 ml. of methyl alcohol and the solution treated with about 8 volumes of acetone causing a red amorphous precipitate to separate from the solution. This precipitate was recovered by centrifugation and reprecipitated in similar manner from a mixture of methyl alcohol and acetone. The red amorphous precipitate consisted of vitamin $B_{12}$ in a state of about 50% purity (5 million L. L. D. units/mg.). A portion of this material (5 mg.) from a total of 21.8 mg.) was dissolved in approximately 0.5 ml. of water and the solution treated with about 5 ml. of acetone. Upon standing clumps of red needle-like crystals of vitamin $B_{12}$, having microbiological potency of about 11 million L. L. D. units/mg. separated from solution and were recovered.

Example 3

About 1388 grams of a dried concentrate prepared like the starting material in Example 1 from elaboration products of a grisein producing strain of *Streptomyces griseus* and having a microbiological potency of about 2000 L. L. D. units/mg. was added to about 16 liters of dry methyl alcohol. The mixture was stirred for approximately 30 minutes and filtered.

The filtrate was adsorbed on about 15 kg. of activated alumina wet with methyl alcohol in a chromatographic column. The column was then developed with methyl alcohol and a number of fractions of eluate were collected.

The chromatograph fractions having the most pronounced microbiological activity were combined and concentrated in vacuo to about one-tenth the original volume. The concentrated mixture was filtered and the filtrate further concentrated in vacuo to a heavy syrup. Ethyl alcohol was added to this syrup and the mixture was filtered. The filtrate was then treated with sufficient acetone with stirring to cause complete precipitation of the red material contained therein. The red precipitate was recovered and redissolved in about 100 ml. of methyl alcohol. This solution was then poured slowly with stirring into about 1 liter of acetone. A light red flocculent material precipitated from the solution and was recovered. Upon washing and drying the precipitate there was secured 7.8 g. of a red powder, having a microbiological potency of about 65,000 L. L. D. units/mg., or about 0.6% vitamin $B_{12}$.

It is noted that in this example the vitamin $B_{12}$ content of the product obtained in one chromatographic step (0.6% vitamin $B_{12}$) was much less than in the other examples and very much less than need be the case. The example is given to illustrate the fact that our treatment, even when not conducted to obtain maximum potency from the chromatographic treatment, yields a product which is far more potent than any previously known anti-pernicious anemia concentrates with which we are familiar, and which, if desired, may be used for clinical purposes without further concentration.

In general, factors which increase the vitamin $B_{12}$ content of the product obtained in our chromatographic steps are: (1) increasing the ratio of the weight of the alumina adsorbent to the weight of the solids adsorbed; (2) care in excluding water from the concentrate adsorbed and the alcohol solvent used; and (3) care in selecting the most potent fractions.

*Example 4*

10.0 grams of concentrate of the type described in the preceding example, having an average potency of 80,000 L. L. D. units/mg. was dissolved in methyl alcohol and the solution adsorbed on about 500 grams of activated alumina wet with methyl alcohol in a chromatographic column. The column was then developed with methyl alcohol and separate fractions of eluate collected.

The fractions having pronounced microbiological activity were selected, combined and evaporated to dryness at a pressure less than atmospheric. The residue was extracted with absolute ethyl alcohol and the white substance which failed to dissolve was removed. The red ethyl alcohol solution was treated with an excess of acetone, causing an insoluble red oil to separate. This oil was recovered and dissolved in about 10 ml. of water. The active material, with some accompanying inert matter, was again precipitated as an oil by the addition of excess acetone. The highly active red material was redissolved in about 3 ml. of water and the solution treated with acetone until a faint turbidity was noted. Upon standing, red, needlelike crystals of vitamin $B_{12}$ separated from solution.

*Example 5*

13.5 kg. of ether precipitated concentrate having an L. L. D. activity of about 2000 units/mg. prepared as in Example 1, was extracted three times by stirring for thirty minutes with 13 gal. of methyl alcohol. The combined extracts were chromatographed on 17 columns, each six inches in diameter and containing 7.5 kg. of activated alumina, wet with methyl alcohol. Each column was developed with methyl alcohol, and a series of 1.5 liter eluate fractions was collected as soon as the red color, characteristic of vitamin $B_{12}$ appeared in the eluate. The first three of these eluate fractions from all of the columns were combined, and evaporated to approximately 500 ml. at reduced pressure and a temperature below 30° C. The solution was freed of a white insoluble material by filtration and treated with acetone until the red color was essentially completely precipitated in the form of red oil. The yellowish-brown supernatant liquid was discarded. The red oil residue was redissolved in a minimum quantity of methyl alcohol and the solution again treated with acetone until substantially all of the red active substance was precipitated. This procedure was repeated until the acetone-methyl alcohol supernatant liquid was substantially free of yellow-brown color. The red oily precipitate was then dissolved in a minimum quantity of methyl alcohol, and the resulting solution poured slowly into 10 volumes of acetone. The red amorphous precipitate which formed was removed by filtration, washed with acetone, and dried in a vacuum at room temperature. Its L. L. D. potency corresponded to a content of about 5% vitamin $B_{12}$. The oral administration in a single dose of a 5% vitamin $B_{12}$ concentrate equivalent to 600 micrograms of vitamin $B_{12}$ produced a maximal hematological response in one patient. In another, an amount equivalent to 25 micrograms was hematopietically active when injected intramuscularly in a single dose. This material for injection was prepared by dissolving the vitamin $B_{12}$ concentrate in a saline solution.

*Example 6*

A broth was prepared by cultivating a streptomycin producing strain of the microorganism *Streptomyces griseus* in a suitable culture medium. The resulting broth was freed of the propagation organism and other solid material and contacted with an ion-exchange resin deriving its exchange capacity from carboxylic groups whereby the streptomycin was adsorbed on said resin. The broth from which streptomycin had been removed was then treated with carbon. The active material was eluted from the carbon adsorbate with aqueous pyridine and the eluate evaporated to a small volume and the active concentrate precipitated with ether. The concentrate was dried.

The dry-ether-precipitated solid concentrate (1628 g. including 700 g. of filter aid), which had an L. L. D. activity of 2500 units/mg., was ground to a fine powder and extracted four times by stirring for 30 minutes with 3500 ml. of methyl alcohol and filtering. The combined methyl alcohol extracts were chromatographed on 15 kg. of activated alumina, and the column washed with methyl alcohol. As soon as the red color characteristic of vitamin $B_{12}$ appeared in the effluent, a series of 3000 ml. fractions were collected. The first five of these containing a total of 673 million L. L. D. units, were combined and concentrated in vacuo at a temperature below 40° C. to 120 ml. The impure vitamin $B_{12}$ was recovered by pouring this solution into 120 ml. of acetone; the resulting red precipitate was removed by centrifugation, washed with acetone, and dried at room temperature. Further purification was attained by dissolving the solid in 5 ml. of methyl alcohol and adding 25 ml. of acetone. The resulting precipitate was collected by centrifugation, washed with acetone, and dried, the yield was 89.8 mg.

The above red solid was dissolved in 3 ml. of methyl alcohol and chromatographed on 4.5 g. of activated alumina. The column was washed with methyl alcohol. When the red color characteristic of vitamin $B_{12}$ appeared in the eluate, a series of three to four ml. fractions was collected. The first five of these, containing substantially all of the red color, were individually evaporated to dryness, dissolved in about 0.3 ml. of water, and the solution treated with acetone until slightly turbid. On standing for 24 hours, red needle-like crystals formed in each of the five tubes. The crystals were collected and combined, washed with acetone, and dried. The yield was 14.1 mg. of crystalline vitamin $B_{12}$. This product was tested and found to be clinically active.

The various products herein described which possess an L. L. D. activity of 65,000 L. L. D. units to 11,000,000 L. L. D. units per milligram are all suitable for clinical use, and are advantageously administered parenterally in the form of therapeutic solutions in water, saline solutions, isotonic solutions or the like. The concentrations of vitamin $B_{12}$ desirable in such solutions may vary over wide limits depending upon the requirements of individual cases.

Modifications may be made in carrying out the present invention without departing from the spirit and scope thereof and the invention is to be limited only by the appended claims.

We claim:

1. A process for making concentrates rich in vitamin $B_{12}$, which comprises successively chromatographically adsorbing a solution of an L. L. D. active crude concentrate recovered by adsorption and elution of fermentation products elaborated by *Streptomyces griseus* and having at least 1,500 L. L. D. units per milligram on the solid content thereof, eluting the pink adsorbate, retaining after each chromatographic treatment the more L. L. D. active eluate fraction and discarding the less L. L. D. active eluate fraction, and continuing such chromatographic treatments successively until the last retained fraction has a significantly higher L. L. D. activity.

2. In a process for obtaining vitamin $B_{12}$ in crystalline form, the steps which comprise dissolving in water a concentrate of *Streptomyces griseus* elaboration products having an L. L. D. activity of at least 5,000,000 L. L. D. units per milligram, adding acetone to the solution until precipitation occurs, separating said precipitate, dissolving said precipitate in water and adding acetone to the solution until turbidity occurs, allowing the turbid solution to stand until crystals form, separating the mother liquor and recovering the crystals.

3. A process for obtaining concentrates rich in vitamin $B_{12}$, which comprises extracting a dry L. L. D. active concentrate of fermentation products elaborated by *Streptomyces griseus* with a lower aliphatic water miscible alcohol, adsorbing solutes from said extract on an alumina chromatographic column, eluting said column with a lower aliphatic water miscible alcohol, collecting the eluate in successive fractions, retaining those fractions which have relatively high L. L. D. activity and discarding the other fractions, and eliminating solvent from the retained fraction.

4. A process for obtaining concentrates rich in vitamin $B_{12}$, which comprises extracting a dry L. L. D. active concentrate of fermentation products elaborated by *Streptomyces griseus* with methyl alcohol, absorbing solutes from said extract on an alumina chromatographic column, eluting said column with methyl alcohol, collecting the eluate in successive fractions, retaining those fractions which have relatively high L. L. D. activity and discarding the other fractions, and eliminating solvent from the retained fraction.

5. In a process for obtaining vitamin $B_{12}$ in crystalline form, the steps which comprise dissolving a red colored vitamin $B_{12}$ active concentrate of *Streptomyces griseus* elaboration products in a solvent for vitamin $B_{12}$ selected from the group consisting of ethyl alcohol and methyl alcohol, separating from the solution any undissolved matter, adding acetone to the solution until precipitation of the red colored constituents occurs, separating said precipitate, repeating the foregoing steps with said precipitate until brownish or yellowish color is absent from the supernatant liquid after precipitation, and dissolving said last precipitate in water.

6. In a process for obtaining vitamin $B_{12}$ in crystalline form, the steps which comprise dissolving a red colored vitamin $B_{12}$ active concentrate of *Streptomyces griseus* elaboration products in a solvent for vitamin $B_{12}$ selected from the group consisting of ethyl alcohol and methyl alcohol, separating from the solution any undissolved matter, adding ether to the solution until precipitation of the red colored constituents occurs, separating said precipitate, repeating the foregoing steps with said precipitate until brownish or yellowish color is absent from the supernatant liquid after precipitation, and dissolving said last precipitate in water.

7. In a process for obtaining vitamin $B_{12}$ in crystalline form, the steps which comprise dissolving a red colored vitamin $B_{12}$ active concentrate of *Streptomyces griseus* elaboration products in a solvent for vitamin $B_{12}$ selected from the group consisting of ethyl alcohol and methyl alcohol, separating from the solution any undissolved matter, adding chloroform to the solution until precipitation of the red colored constituents occurs, separating said precipitate, repeating the foregoing steps with said precipitate until brownish or yellowish color is absent from the supernatant liquid after precipitation, and dissolving said last precipitate in water.

8. In a process for preparing anti-pernicious anemia material, the steps of filtering streptomycin liquors with charcoal to adsorb thereon material containing the anti-pernicious anemia principle, treating the adsorbed material with aqueous pyridine to remove the adsorbed anti-pernicious anemia principle, and then separating the pyridine therefrom.

9. In a process for preparing anti-pernicious anemia material, the steps of contacting with charcoal a liquor containing the anti-pernicious anemia principle formed in the production of streptomycin by fermentation to adsorb thereon material containing the anti-pernicious anemia principle, treating the adsorbate with aqueous pyridine to remove said principle and separating the pyridine therefrom.

References Cited in the file of this patent

UNITED STATES PATENTS

| Number | Name | Date |
|---|---|---|
| 2,505,053 | Kuehl | Apr. 25, 1950 |

FOREIGN PATENTS

| Number | Country | Date |
|---|---|---|
| 473,064 | Great Britain | Oct. 5, 1937 |

OTHER REFERENCES

Dakin et al.: J. Biol. Chem., 115, pages 771–787 (1936).

Le Page et al.: J. Biol. Chem., 162, pages 163–171 (1946).

Carter et al.: J. Biol. Chem., 160, pages 337–342 (1945).

Science, vol. 107, pp. 396–398, April 16, 1948.

U. S. Dispensatory, 24th ed. (1947), page 248.